United States Patent [19]
Previero

[11] Patent Number: 5,390,799
[45] Date of Patent: Feb. 21, 1995

[54] MACHINE FOR RECYCLING PLASTIC CONTAINERS, IN PARTICULAR BOTTLES

[75] Inventor: Dario Previero, Lipomo, Italy
[73] Assignee: Previero N. s.r.l., Erba, Italy
[21] Appl. No.: 50,294
[22] PCT Filed: Nov. 9, 1991
[86] PCT. No.: PCT/EP91/02135
§ 371 Date: May 10, 1993
§ 102(e) Date: May 10, 1993
[87] PCT Pub. No.: WO92/08591
PCT Pub. Date: May 29, 1992

[30] Foreign Application Priority Data
Nov. 19, 1990 [IT] Italy ............................. 22100 A/90

[51] Int. Cl.⁶ ............................................. B07C 9/00
[52] U.S. Cl. ............................ 209/3; 209/690; 209/930; 241/104; 241/105
[58] Field of Search ............... 209/3, 3.1, 7, 930, 209/932, 687, 690; 241/104, 105, 106, 42, DIG. 38

[56] References Cited
U.S. PATENT DOCUMENTS

| | | | |
|---|---|---|---|
| 1,692,974 | 11/1928 | Barker | 241/104 X |
| 3,675,859 | 7/1972 | Mitchell, III | 209/3 X |
| 3,802,631 | 4/1924 | Boyd | 209/3 X |
| 4,073,661 | 2/1978 | Buzga et al. | 209/3 X |
| 4,258,851 | 3/1981 | Lion et al. | 209/687 X |
| 4,533,054 | 8/1985 | Sommer, Jr. et al. | 209/690 X |
| 4,617,111 | 10/1986 | Grimm | |
| 4,778,116 | 10/1988 | Mayberry | 209/930 X |
| 4,844,351 | 7/1989 | Holloway | 209/930 X |

FOREIGN PATENT DOCUMENTS
389488 12/1989 Austria .

OTHER PUBLICATIONS
Patent Abstracts of Japan vol. 6, No. 267, 25 Dec. 1982 & JP,A,57 159 612 Yoshino Kogyosho K.K.) 1 Oct. 1982.
Patent Abstracts of Japan vol. 12, No. 311 24 Aug. 1988 & JP,A,63 084 905 (Yoshino Kogyosho Co Ltd) 15 Apr. 1988.
Patent Abstracts of Japan vol. 6, No. 97 5 Jun. 1982 & JP,A,57 031 529 (Toyo Boseki K.K.) 20 Feb. 1982.

Primary Examiner—D. Glenn Dayoan
Attorney, Agent, or Firm—Sixbey, Friedman, Leedom & Ferguson; Gerald J. Ferguson, Jr.; Tim L. Brackett

[57] ABSTRACT

The machine comprises a hollow rotary body (1) of large dimensions which may be loaded with the containers to be recycled, nozzles for supplying and spraying washing fluid at a predetermined temperature to the rotary body (1) for the mutual separation and washing of the containers and the initial separation of labels and bases, and mechanical impact devices (2), (21, 23) housed in the rotary body (1) and actuated by the rotation of this body so as to exert on the containers a mechanical action suitable for the mutual separation of the containers themselves, the separation of the stoppers and the completion of the washing and label and base separation operation. The rotary body (1) may have an inlet opening (5) and an outlet opening (7) for the containers to be recycled or a single inlet and outlet opening (30) so as to form a machine operating continuously or discontinuously respectively.

11 Claims, 4 Drawing Sheets

MACHINE FOR RECYCLING PLASTIC CONTAINERS, IN PARTICULAR BOTTLES

The present invention relates to a machine for recycling plastic containers, in particular bottles.

TECHNICAL FIELD
BACKGROUND OF THE INVENTION

The recycling of plastic bottles, and in general of all containers made from this material, requires the solution of various problems linked in particular to the dimensions and shape of these bottles, their supply in bulk form and the need to subject them not only to washing but also to separate out contaminant bodies such as labels, stoppers and bases.

It also has to be borne in mind that the bottles are not always made from the same plastic material, since PVC is used in some cases and PET or other materials in other cases, which raises problems as regards their separation in terms of the material from which they are made.

At present there are very few machines able to wash and mutually separate bottles, or containers in general, supplied in bulk or to remove the contaminant bodies accompanying them and very few machines enabling identification of the bottles in terms of the plastic material from which they are made.

Those machines which do exist are structurally and operationally complex and somewhat inadequate from the point of view of efficiency and production capacity as they are able to process only a limited number of bottles at a time.

SUMMARY OF THE INVENTION

The main object of the invention is therefore to provide a machine for the recycling of plastic bottles and containers in general which is structurally simple and able to wash the bottles or other containers and to separate them from one another and from contaminant bodies such as labels, stoppers and bases efficiently and with a high production output.

A further object of the invention is to provide a machine of the type described above which is also able to identify the bottles (or containers in general) as a function of the plastic material from which they are made.

In accordance with the invention these objects are achieved with a machine essentially characterized in that it comprises a hollow rotary body of large dimensions which may be loaded with the containers to be recycled, means for supplying washing fluid at a predetermined temperature to the rotary body for the mutual separation and washing of the containers and the initial separation of labels and bases and mechanical impact means housed in the rotary body and actuated by the rotation of this body so as to exert on the containers a mechanical action suitable for the mutual separation of the containers themselves, the separation of the stoppers and the completion of the washing and label and dreg removal operation.

It has been possible to verify that the combined action of the washing fluid, for instance hot water, superheated water or steam with or without chemical additives, preferably sprayed on the containers in order to increase the mechanical action, and the mechanical impact means, for instance mechanical blades rigid with the rotary body, moving weights connected to a fixed support housed in the rotary body or to this rotary body but oscillating with respect thereto, floating spheres or like means, provides optimum results as regards the mutual separation of the containers, their washing and the separation of the labels, bases, stoppers and any other contaminant bodies.

More precisely, the containers supplied in bulk are separated by the combined hydraulic and mechanical action and are washed internally and externally thereby eliminating any trace of dirt. The label and base adhesive is dissolved by the washing fluid, especially when at high temperature, and if the labels are of paper they are reduced to pulp for the same reason. If the labels are of thermo-extensible plastic, however, the heat imparted causes them to expand and therefore become detached from the container. The mechanical action facilitates and completes the separation of labels and bases and promotes the separation of the stoppers. If the containers are of different plastic materials, for instance PVC and PET, the fluid supplied, especially if appropriate additives are added, causes a different colouring or opacification of these containers with the result that they can be readily identified during subsequent manual or automatic separation.

It should also be noted that for the purposes of the efficiency of the recycling operation as well as the production capacity of the machine, it is essential for the container treatment time to be high and for the rotary body to be able to contain a large number of containers both initially in bulk form, and subsequently in a separated and fully open condition. A rotary body of considerable size is required for this purpose in which the Containers may remain and be subject to thermohydraulic and mechanical treatment for a long period.

The machine of the invention may be embodied as a continuous or discontinuous machine.

BRIEF DESCRIPTION OF THE DRAWINGS

Both versions are shown diagrammatically, purely by way of example, in the accompanying drawings, in which.

DETAILED DESCRIPTION OF THE PREFERRED EMBODIMENT

Figure 1:
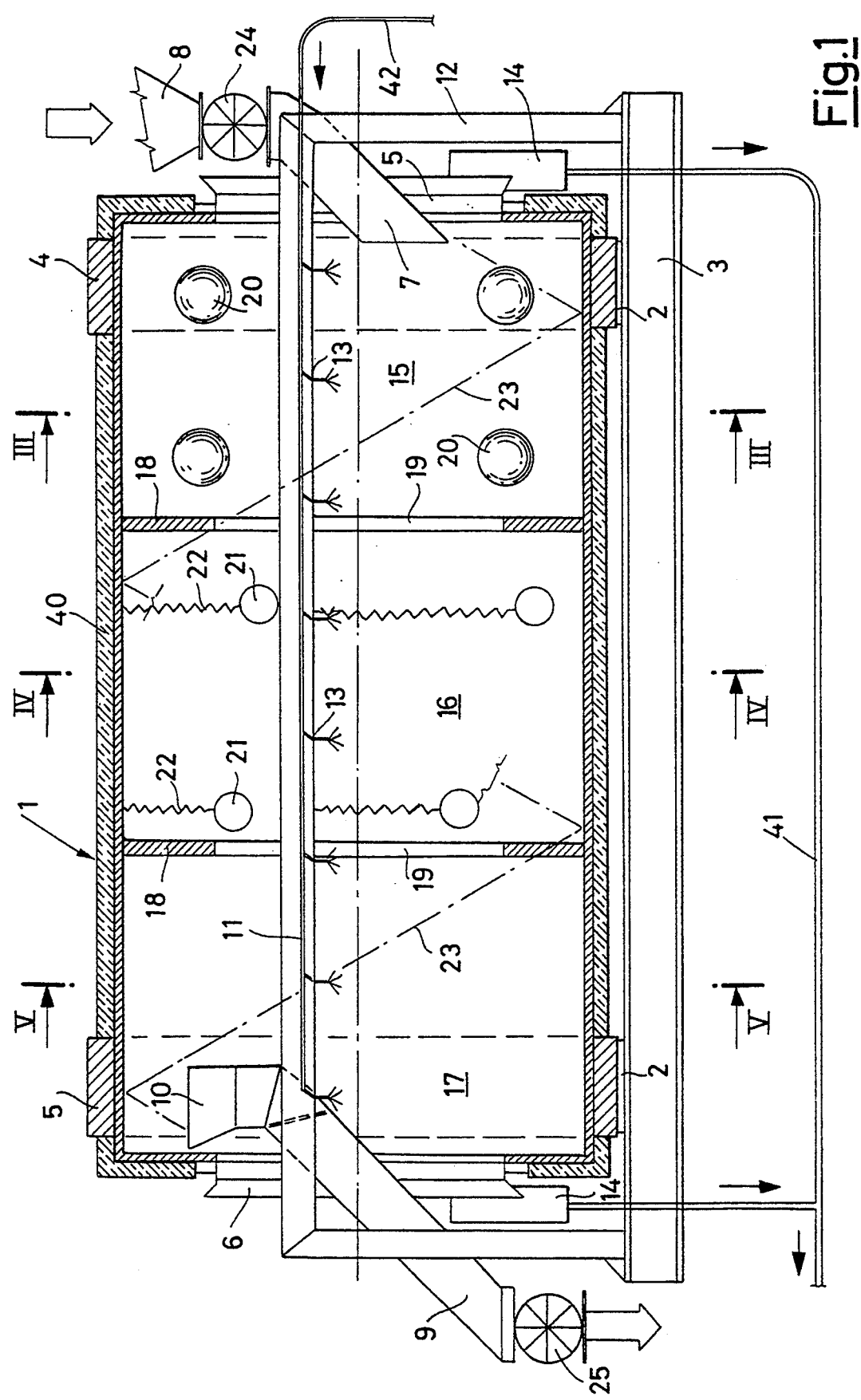
FIG. 1 is a diagrammatic illustration in axial section through a machine of a continuous type.
Figure 2:
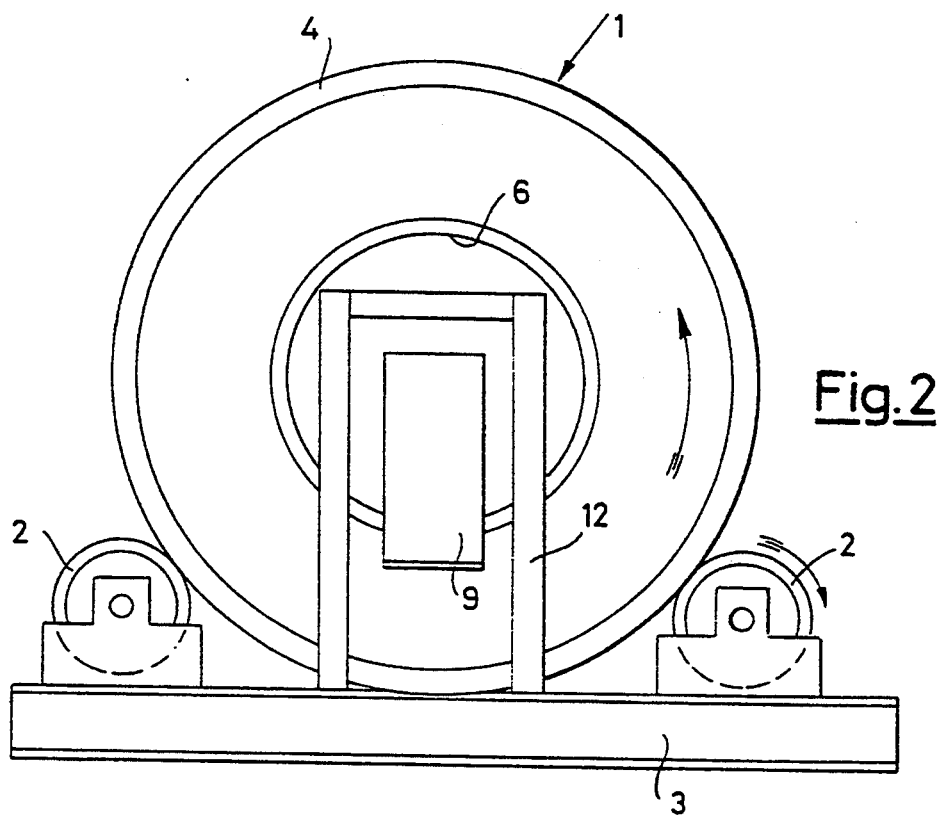
FIG. 2 is a front view of the above machine from the left with respect to FIG. 1.
Figure 3:
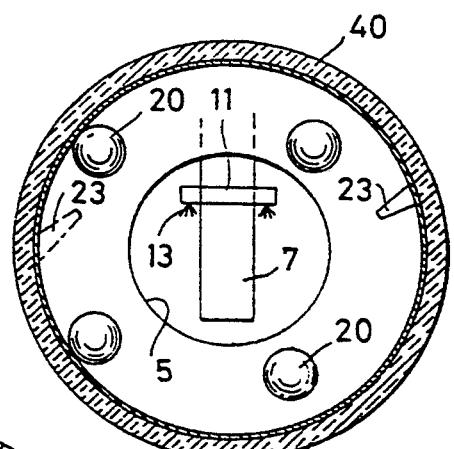
FIGS. 3 to 5 show this machine in cross section along the lines III—III, IV—IV and V—V of FIG. 1 respectively.
Figure 4:
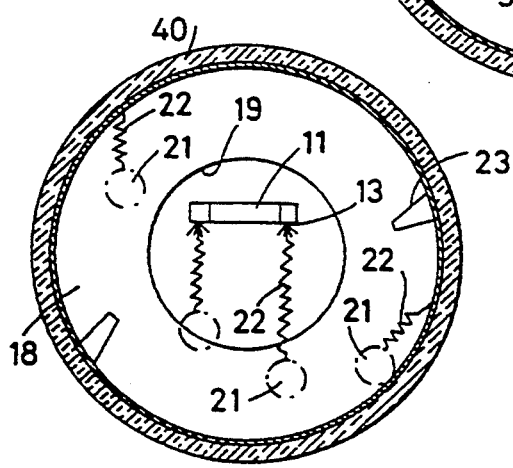
Figure 5:
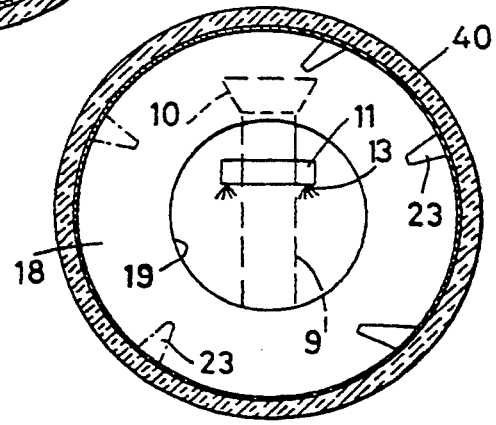
Figure 6:
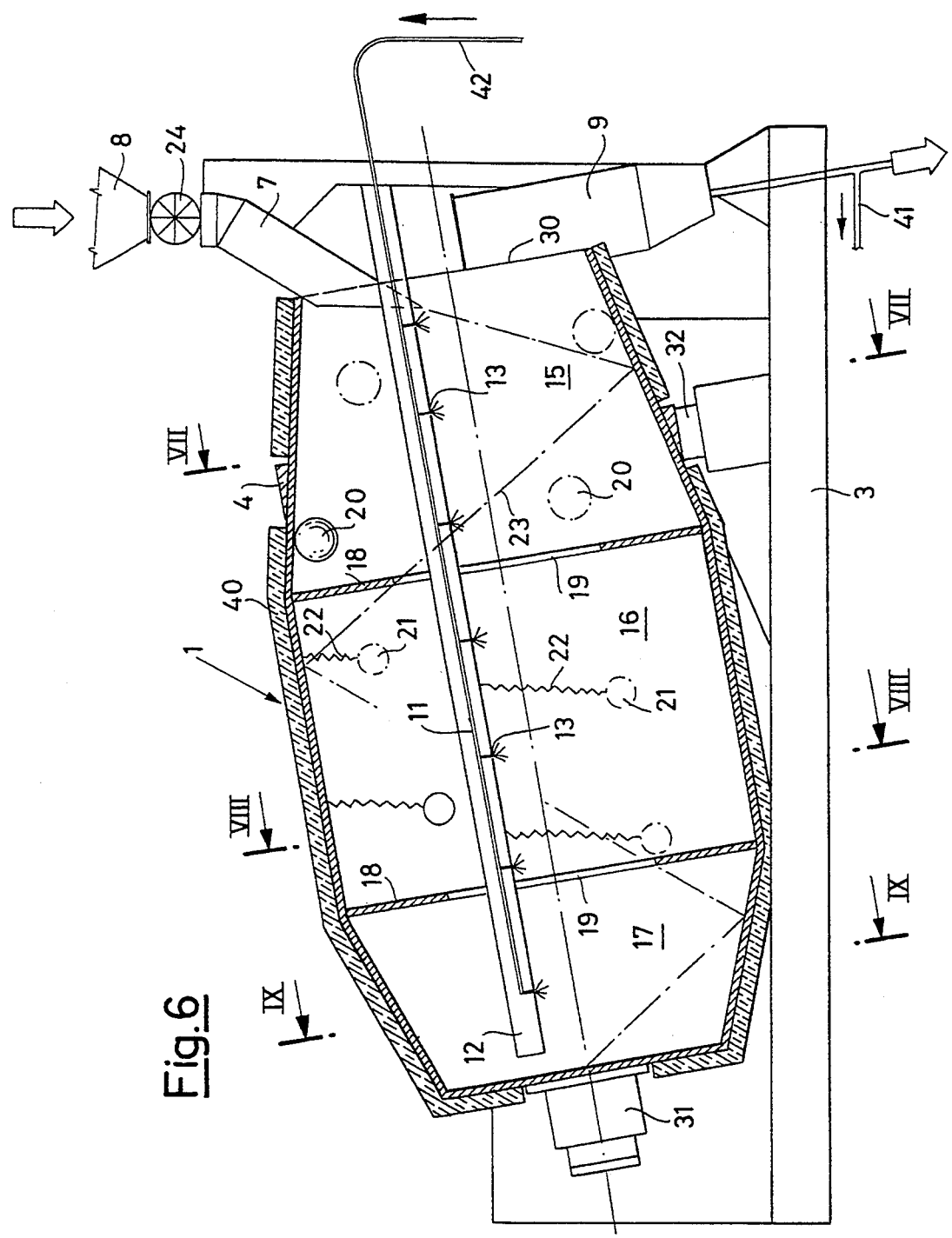
FIG. 6 is a diagrammatic illustration in axial section through a machine of a discontinuous type.
Figure 7:
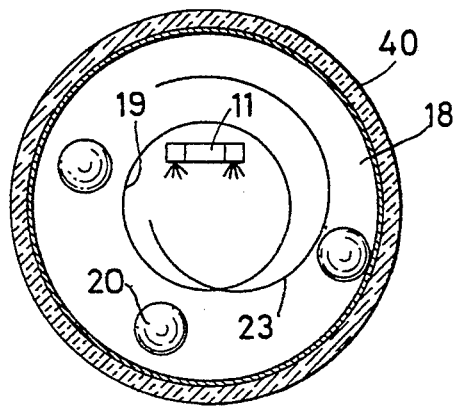
FIGS. 7 to 9 show this machine in cross section along the lines VII—VII, VIII—VIII and IX—IX respectively.

FIGS. 1 to 5 show a machine of the invention of the continuous type. It comprises a hollow body 1 of substantially cylindrical shape with suitably insulated walls 40 which is supported and caused to rotate by a pair of motor-driven rollers 2 (FIG. 2) supported by a base 3. The drive engagement between the rollers 2 and the rotary body 1 is provided at the location of reinforcing strips 4 of the rotary body.

As shown in FIG. 1, the hollow rotary body 1 has an inlet opening 5 and an outlet opening 6 for the material to be recycled. A loading duct 7 with a control valve 24 and a hopper 8 is provided at the inlet opening 5 and a discharge duct 9 with a control valve 25 and a hopper 10 with a vertical opening is provided at the outlet opening 6.

A hydraulic duct 11 supported by a fixed frame 12 passes axially though the entire rotary body 1 from the inlet opening 5 almost as far as the outlet opening 6 for the supply of washing fluid at a predetermined temperature (for instance hot water, superheated water, steam) with or without chemical additives which is distributed within the rotary body 1 by spray nozzles 13. This fluid is then evacuated via apertures 14 and conveyed through ducts 41 to a collection tank (not shown) from which it is preferably taken for recycling in a system (not shown) comprising a pump, a vibrating screen, a further collection tank and a heating and pumping unit which supplies it to the duct 11 via a duct 42.

The inner space of the rotary body 1 is divided into three sectors 15, 16 and 17 by two partitions 18 provided with large central holes 19 for the passage of the duct 11 and the material to be treated. The sector 15, which is closest to the inlet opening 5, houses floating spheres 20, for instance of elastomer, which are adapted to collide with the containers which have just been supplied in bulk in order to assist their separation. The intermediate sector 16 houses weights 21 connected by chains or other pliable suspension means 22 to the inner wall of the rotary body 1 or the hydraulic duct 11; these weights are adapted to complete, where necessary, the mutual separation of the containers, to facilitate the separation of the stoppers and to help to separate labels and bases which have already been partially separated from the containers as a result of the thermohydraulic action exerted by the washing fluid. The inner wall of the three sectors 15, 16 and 17 is finally provided with helically disposed agitating blades 23 which are adapted to keep the material moving during treatment and to convey it gradually to the discharge hopper 10.

FIGS. 6 to 9 show a machine of a discontinuous type. The structure of this machine is substantially the same as that of the continuous machine with the exception that a single inlet and outlet opening 30 is provided, both the loading duct 7 and the discharge duct 9 being provided at this location; the discharge duct, provided with a large horizontal opening to allow improved access by the treated containers, is also used for the discharge of the washing fluid. Motorization is provided by a motor 31 and idler wheels 32 supported by the base 3 support the rotary body 1. Identical components, bearing the same reference numerals, are not described again.

This type of discharge with a large horizontal opening, particularly suited to containers of irregular shape and large dimensions, may be used with the machine of a continuous type described above.

Figure 10:
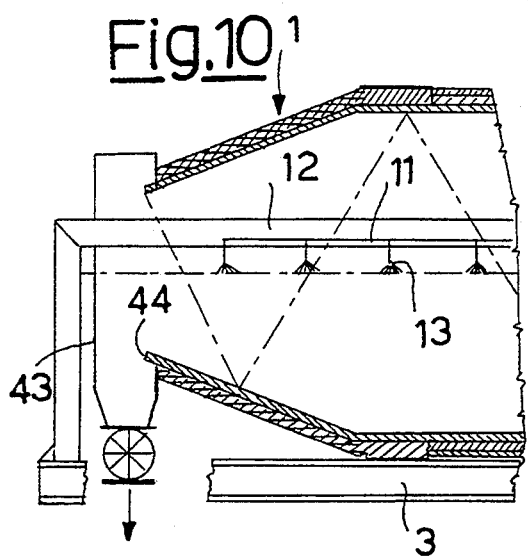
FIG. 10 is a diagrammatic axial section through a different loading zone for a machine of the continuous type as shown in FIG. 1.
Figure 9:
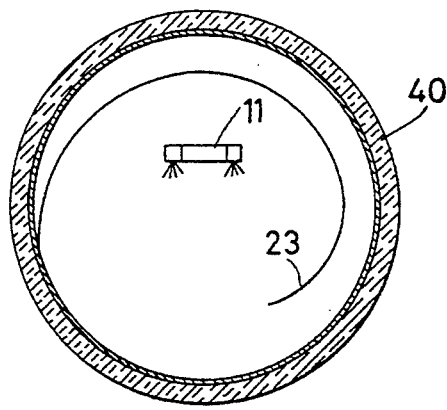
Figure 8:
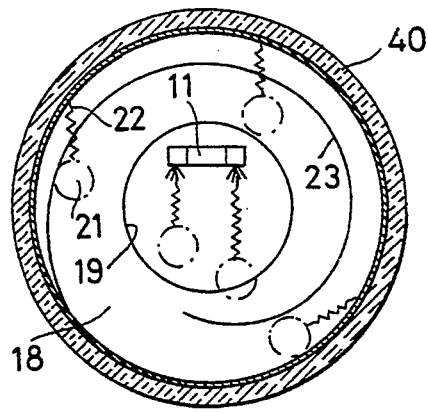

This variant is shown in FIG. 10 where the discharge duct is shown by 43 and its opening by 44, while the other reference numerals are the same as those of corresponding structural components of FIG. 1.

As shown, the side wall of the hollow body 1 converges towards the opening 44 to facilitate the discharge of the containers.

A similar variant may be provided for the loading zone for the containers to be treated.

I claim:

1. A machine for recycling plastic containers, in particular bottles, comprising a hollow rotary body rotated about a longitudinal substantially horizontal axis and provided with inlet and outlet means for the containers to be recycled, spraying means for supplying washing fluid at a predetermined temperature into the rotary body, and mechanical impact means housed in the rotary body and actuated by rotation of the rotary body to collide with the containers to be recycled, wherein said hollow rotary body has a continuous lateral wall for retaining the washing fluid inside the rotary body during a recycling operation.

2. A machine as claimed in claim 1, characterized in that the mechanical impact means (20, 21, 23) comprise agitator blades (23) which are disposed helically along the inner wall of the hollow rotary body (1).

3. A machine as claimed in claim 1, characterized in that the hollow rotary body (1) has an inner space divided into adjacent communicating sectors (15, 16, 17) and in that the mechanical impact means (20, 21, 23) comprise moving bodies (20, 21) striking the containers.

4. A machine as claimed in claim 3, characterized in that the moving striker bodies (20, 21) comprise floating spheres (20) housed in that sector (15) of the adjacent sectors (15, 16, 17) which is closest to an inlet opening (5) for the material in the rotary body (1).

5. A machine as claimed in claim 3, characterized in that the moving striker bodies (20, 21) comprise suspended weights (21) housed in an intermediate sector (16) of the adjacent sectors (15, 16, 17).

6. A machine as claimed in claim 1 characterized in that the spraying means (11, 13) for supplying the washing fluid comprise nozzles (13) for spraying the fluid onto the containers.

7. A machine as claimed in claim 1, characterized in that the washing fluid contains chemical additives adapted to cause a different colouring or opacification of the containers depending on the plastic material from which they are made.

8. A machine as claimed in claim 1, characterized in that the hollow rotary body (1) has an inlet opening (5) and an outlet opening (6, 43) for the containers to be recycled so as to form a continuously operating machine.

9. A machine as claimed in claim 8, characterized in that the outlet opening (6, 43) is formed by a discharge duct (43) with a large horizontal opening (44).

10. A machine as claimed in claim 9, characterized in that the hollow body (1) has a side wall converging towards the outlet opening (44) of the discharge duct (43).

11. A machine as claimed in claim 1, characterized in that the hollow rotary body (1) has a single inlet and outlet opening (30) for the containers to be recycled so as to form a discontinuously operating machine.

* * * * *